Aug. 19, 1930.                J. H. HICKEY                1,773,182
                                FUSE CASING
                            Filed March 19, 1928

INVENTOR.
JOHN H. HICKEY.
BY
ATTY.

Patented Aug. 19, 1930

1,773,182

UNITED STATES PATENT OFFICE

JOHN H. HICKEY, OF SAN FRANCISCO, CALIFORNIA

FUSE CASING

Application filed March 19, 1928. Serial No. 262,677.

My invention relates to improvements in casings for electric fuses wherein tortuous vent passages are provided with a plurality of outlet passages communicating between the vent passage and the interior of the casing to permit the escape of gas when a fuse is blown and to prevent obstruction of the vent by metal thrown off from a blown fuse.

The primary object of the present invention is to provide an improved fuse casing.

Another object is to provide an improved casing provided with improved venting means adapted to insure an efficient venting of gas from the casing when a fuse is blown.

A further object is to provide an improved casing having a vent provided with a plurality of passages communicating with the interior of the casing to insure against a material obstruction of the vent by metal thrown off from a blown fuse.

Another object is to provide an improved casing having an improved tortuous vent passage providing a plurality of paths through which gas may escape from the casing and which will permit an efficient venting of a fuse regardless of the obstruction of certain of the outlet and vent passages.

A still further object is to provide an improved casing provided with an improved vent which can be easily and economically formed and which will be efficient in service and prolong the utility of the casing.

I accomplish these and other objects by means of the improved device disclosed in the drawings forming a part of the present application wherein like characters of reference are used to designate similar parts throughout the specification and drawings and in which—

Figure 1:
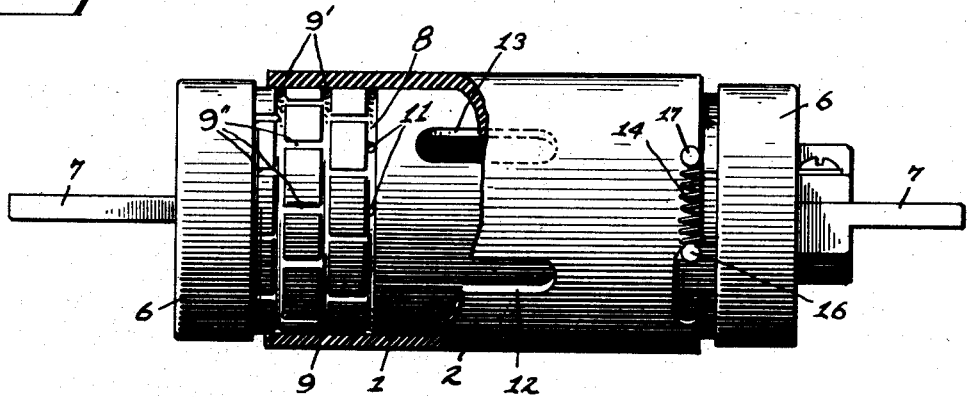
Fig. 1 is a side elevation of a fuse provided with my improved casing; the outer casing section being partly broken away and shown in section.
Figure 2:
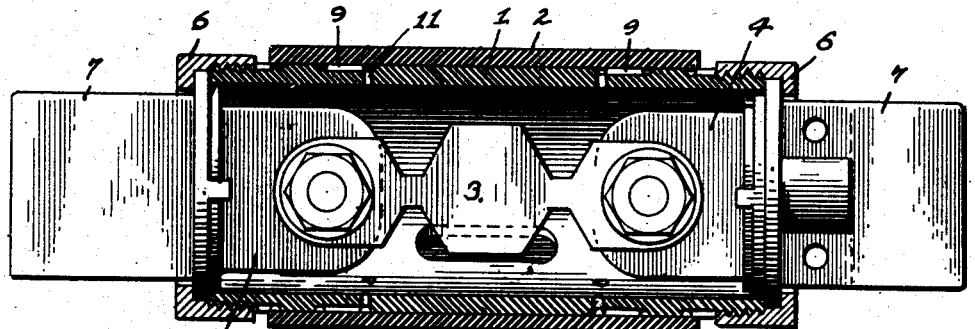
Fig. 2 is a longitudinal mid-section taken at right angles to the position shown in Fig. 1.
Figure 3:
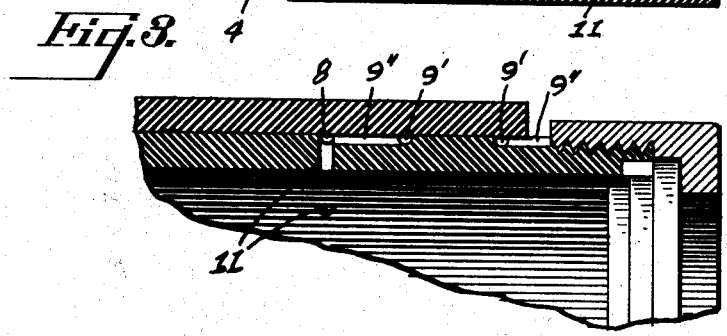
Fig. 3 is an enlarged broken sectional detail disclosing the form and arrangement of the vent.

Referring to the drawings, my improved casing consists of a casing preferably comprising inner and outer telescoping casing sections 1 and 2 forming a shell arranged to contain a fusible element 3 connected between conductors 4 detachably secured within the ends of the shell by means of caps 6 threaded onto the ends of the inner shell 1, said conductors being provided with blades 7 arranged to engage the terminals of a fuse block, not shown, in the well known manner.

Upon each end of the casing is formed a vent passage consisting of an annular main vent channel 8 and a tortuous passage 9, preferably consisting of a plurality of annular channels 9' longitudinally spaced between the main channel 8 and the end of the casing and a plurality of connecting passages 9" arranged in staggered relation between each channel and the adjacent channels. A plurality of outlet passages 11 are formed to communicate between the main channel 8 and the interior of the casing, to permit the escape of gas from the fuse shell to the vent passage. In the preferred construction illustrated, the channels are formed upon the outer surface of the inner shell section 1 and are covered by the outer shell 2 telescoping closely thereover.

The outer shell is provided with a window 12 arranged to be turned to register with a window 13 formed in the inner shell 2 to permit observation of the fusible element within the fuse. A spring 14, connected between the pins 16 and 17 carried by the inner and outer casing sections 1 and 2 respectively, serves to normally hold the outer casing with the windows out of registering relation. The outer casing 2 is made slightly shorter than the space between the caps 6 and the passages 9" extending outwardly from the outermost vent passage channel 9' are extended past the ends of the outer casing to permit the outward passage of gas therefrom.

In operation, the fuse is applied and operated under normal conditions in the ordinary manner. When the fusible element is fused by the passage of an excessive current therethrough, an intense heat and a sudden expansion of gas within the casing results. Pressure thus caused within the casing is relieved through the vent passages to avoid the bursting of the casing, the gas being allowed to expand and escape slowly through the vent passage whereby said gas becomes sufficiently cooled before issuing from the casing to avoid starting fires or damaging surrounding objects. The hot expanded gas passes through the outlet passages 11 into the main vent channel 8 and thence through the connecting passages 9'' and passage channels 9' outwardly past the ends of the outer casing section. The movement of the gas is from the middle portion of the casing, near the point at which the greatest heat occurs toward the ends of the fuse where the heat is less intense, thereby facilitating the escape and cooling of the gas. A relatively large number of outlet passages 11 are formed to communicate with each main channel 8 in order to insure an adequate outlet for the gas. This is of particular importance because of the fact that when the fuse is blown, small particles of the fusible metal are projected in all directions from the fusible element. In case such a particle of metal enters an outlet passage, the outlet is closed and becomes inoperative as a vent. This occurs so frequently that I have found it to be advantageous to provide a relatively large number of spaced outlets communicating with a single main channel so that in the event that one or even several of the outlets become thus obstructed, the gas may still escape through such outlets as still remain open. In like manner, a plurality of staggered connecting passages 9'' are provided between the vent passage channels to insure against possible obstruction of the vent passage by metal lodging within one of the connecting passages or vent passages. This permits the fuse to be refilled repeatedly and insures a prolonged utility without danger of bursting the casing by the obstruction of the vents.

While I have illustrated and described only the preferred embodiment of my invention, the specific form and arrangement of the vent passage and outlet passages may of course be modified in a great number of ways without departing from the spirit of my invention. I therefore do not wish to restrict myself to the precise details of construction and arrangement as disclosed, but desire to avail myself of all modifications which may fall within the scope of the appended claims.

Having thus described my invention what I claim as new and desire to secure by Letters Patent is—

1. A fuse casing comprising a tubular body having a tortuous vent passage consisting of a plurality of interconnected channels formed within the casing body and having a plurality of outlet openings opening from one end of the vent passage into the interior of the casing and having a plurality of openings opening from the opposite end of each vent passage to the atmosphere to permit the escape of gas from the casing when a fuse is blown.

2. A fuse casing comprising a tubular body having a tortuous vent passage formed within the casing body and longitudinally disposed along said body adjacent both ends thereof, and having a plurality of outlet openings opening from each vent passage into the interior of the casing to permit the escape of gas from the casing when a fuse is blown.

3. A fuse casing comprising a tubular body having a tortuous vent passage formed within the casing body adjacent the ends thereof, said passages each consisting of a plurality of intercommunicating channels and having a plurality of outlet openings communicating between each passage and the interior of the casing to permit the escape of gas from the casing when a fuse is blown.

4. A fuse casing comprising a tubular body having a tortuous vent passage formed within the casing body adjacent the ends thereof, said passages each consisting of a plurality of intercommunicating channels and having a plurality of outlet openings communicating between each passage and the interior of the casing to permit the escape of gas from the casing when a fuse is blown, said outlet openings being spaced from the ends of the casing.

5. A fuse casing comprising a tubular body having a tortuous vent passage consisting of a plurality of spaced annular channels and a plurality of spaced connecting passages between each channel and the adjacent channels, and a plurality of outlet openings communicating between the passage and the interior of the casing to permit the escape of gas from the casing when a fuse is blown.

6. A fuse casing comprising a tubular body having a tortuous vent passage consisting of a plurality of channels spaced longitudinally inwardly from an end of the casing and having a plurality of connecting passages between each channel and the adjacent channels, and a plurality of outlet openings communicating between the vent passage and the interior of the casing to permit the escape of gas from the casing when a fuse is blown.

7. A fuse casing comprising a tubular body having a tortuous vent passage formed at each end of the casing and consisting of a plurality of channels longitudinally spaced inwardly from the ends of the casing and having a plurality of connecting passages between each channel and the adjacent channel, and a plurality of outlet openings communicating between the innermost channels of the passages and the interior of the casing to permit the escape of gas from the casing when a fuse is blown.

8. A fuse casing comprising a tubular body having tortuous vent passages formed adjacent each end of the casing and consisting of a plurality of annular channels spaced inwardly from the ends of the casing and having a plurality of connecting passages formed in staggered relation between each channel and the adjacent channels; and a plurality of spaced outlet openings communicating between the innermost channel of each passage and the interior of the casing to permit the escape of gas from the casing when a fuse is blown.

9. A fuse casing comprising a pair of telescoping tubular sections; a tortuous vent passage formed by a groove formed upon one of the tubular sections and covered by the other section; and a plurality of spaced outlet passages opening into the vent passage from the interior of the casing to permit the escape of gas from the casing when a fuse is blown.

10. A fuse casing comprising a pair of telescoping tubular sections; a tortuous vent passage formed by a groove formed upon one of the tubular sections adjacent each end thereof and covered by the opposite section; and a plurality of outlet passages communicating between each passage and the interior of the casing at points spaced from the ends of the casing to permit the escape of gas from the casing when a fuse is blown.

11. A fuse casing comprising a pair of telescoping tubular sections; a tortuous vent passage formed between the tubular sections adjacent each end thereof, said passages consisting of a plurality of longitudinally spaced channels and a plurality of connecting passages formed between each channel and the adjacent channels; and a plurality of outlet passages communicating between each vent passage and the interior of the casing to permit the escape of gas when a fuse is blown.

12. In an electric fuse, a casing having a vent passage comprising a main vent channel, a tortuous passage, and a plurality of connecting channels connecting the tortuous passage with said main vent channel, and a plurality of inlet passages communicating between the main vent channel and the interior of the casing to permit the escape of gas from the casing.

13. In an electric fuse, a casing having a vent passage comprising a main vent channel, a plurality of passage channels longitudinally spaced from the main channel toward the adjacent end of the casing, a plurality of connecting passages between each channel and the adjacent channels, said connecting passages being arranged in staggered relation; and a plurality of outlet passages communicating between the main vent channel and the interior of the casing to permit the escape of gases from the casing when a fuse is blown.

14. In an electric fuse, a casing having a pair of vent passages arranged adjacent the ends of the casing, said passages comprising a main vent passage and a plurality of passage channels spaced longitudinally along the casing toward the ends, and connecting passages arranged in staggered relation and connecting each channel with the adjacent passages; and outlets communicating between the main channels and the interior of the casing to permit the escape of gas from the casing when a fuse is blown.

In witness whereof, I hereunto set my signature.

JOHN H. HICKEY.